United States Patent [19]
Terada et al.

[11] Patent Number: 5,301,313
[45] Date of Patent: Apr. 5, 1994

[54] MANIPULATING DATA IN A RELATIONAL DATA BASE HAVING OPERATIONAL MANIPULATIONS DEFINED IN AN INPUT TABLE AND DISPLAYED RESULTS IN AN OUTPUT TABLE WITH A LINE DISPLAYED DESIGNATING DIRECTION OF DATA FLOW

[75] Inventors: Hiroaki Terada; Hiroaki Nishikawa, both of Osaka; Yoshio Sakuta, Oaka; Youichiro Nishikawa, Hyogo; Shuji Hara, Osaka; Yoshie Inaoka, Hyogo; Tetsuo Yamasaki, Hyogo; Kenji Shima, Hyogo; Shin-ichi Yoshida, Nara; Shunji Hine, Osaka, all of Japan

[73] Assignees: Sanyo Electric Co., Ltd., Osaka; Mitsubishi Denki Kabushiki Kaisha, Tokyo; Sharp Kabushiki Kaisha; Matsushita Electric Industrial Co., Ltd., both of Osaka, Japan

[21] Appl. No.: 730,173

[22] Filed: Jul. 15, 1991

[30] Foreign Application Priority Data

Jul. 17, 1990 [JP] Japan .................................. 2-191823

[51] Int. Cl.⁵ .............................................. G06F 15/40
[52] U.S. Cl. .................................. 395/600; 364/282.1; 364/283.4; 364/DIG. 1
[58] Field of Search ............... 395/600, 12, 700, 800, 395/275

[56] References Cited

U.S. PATENT DOCUMENTS

| | | | |
|---|---|---|---|
| 4,506,326 | 3/1985 | Shaw | 395/700 |
| 4,688,195 | 8/1987 | Thompson | 395/12 |
| 4,791,561 | 12/1988 | Huber | 395/600 |
| 4,914,568 | 4/1990 | Kodosky | 395/275 |
| 5,091,852 | 2/1992 | Tsuchida | 395/600 |

OTHER PUBLICATIONS

Ozsoyoglu et al., "Query Processing Techniques in the Summary-Table-by-Example Database Query Language", ACM Transactions on Database Systems vol. 14 No. 4, Dec. 1989, pp. 526–573.

Tansel et al., "Time-by-Example Query Language for Historical Databases", IEEE, (Apr. 1989) pp. 464–478 vol. 15 No. 5 IEEE Transactions on Software Engineering.

*Primary Examiner*—Thomas C. Lee
*Assistant Examiner*—Jennifer M. Orzech
*Attorney, Agent, or Firm*—Lowe, Price, LeBlanc & Becker

[57] ABSTRACT

An apparatus for manipulating a relational data base includes a unit for describing input data in a table format, a unit for describing all the operational manipulation with respect to the input data in a non-text format, and a unit for outputting data by referring to the relational data base based on the described input data and operational manipulation. The input data of a table format includes an input table and an output table. The input table includes an operational description region and the output table includes a region wherein a map relation between the respective items of the input and output table is described. The manipulation contents are described in the operation manipulation description region and the map relation description region. The operation flow is described and defined by a connection line with directiveness. The apparatus enables description of all the operational manipulation in a graphical manner in a non-text format, providing a user with data base manipulation environment with excellent understandability and operability.

12 Claims, 14 Drawing Sheets

MANIPULATING DATA IN A RELATIONAL DATA BASE HAVING OPERATIONAL MANIPULATIONS DEFINED IN AN INPUT TABLE AND DISPLAYED RESULTS IN AN OUTPUT TABLE WITH A LINE DISPLAYED DESIGNATING DIRECTION OF DATA FLOW

BACKGROUND OF THE INVENTION

1. Field of the Invention

The present invention relates generally to a system and a method of manipulating a data base, and more particularly, to a system of manipulating a relational data base.

2. Description of the Background Art

One data base systems directed to making information resources available to users by means of an abbreviated language is a relational data base system.

Data is stored in the form of table in the relational data base system. A table is constituted as shown in FIG. 1, for example, including a table name 100 indicative of the entire contents of the table and item names 101a and 101b for identifying the contents of the respective columns. Data 102a and 102b are placed under the item names 101a and 101b, respectively.

The relational data base stores a plurality of tables. A table name 100 varies from table to table in order to identify each table. In each table, an item name also varies from column to such column that each column is distinguishable from other columns.

A table of a relational data bases comprises a row 103 and columns 104a and 104b. The row 103 is a group of data elements (102a, 102b) related to a particular event.

The relational data base system bases on a relational model. The relational model meets the following three requirements.

(1) Although an internal data construction takes a form of table as shown in FIG. 1, the order of rows and columns thereof is not defined. The table is referred to as a relation table and corresponds to a file. A row corresponds to a record. A column is referred to as attribute or an item and corresponds to a field.

(2) Data in the table are consistent with each other. Therefore, the following two types of integrities are maintained. (a) There exists a data item for identifying each row of the table. Such data is referred to as an item or a primary key. (b) When such primary key is also used as a part of another table, the primary keys in both tables are consistent with each other.

(3) A data manipulation language is prepared which is used for manipulation based on relational algebra.

Languages for use in manipulating a relational data base include SQL (structured query language) and QBE (query by example). General explanations on SQL and QBE are described in "Introduction to Simple Reference Language" by T. Hirao, p. 80–p89, pp. 140–142, Oct. 25, 1983, Ohm Sha.

SQL is a command type language having such a function as data definition (definition of a table and of data manipulation). The command type denotes a format which allows a user to give an instruction through a terminal equipment under TSS (time sharing system) without using a program. The SQL is an non-procedure language which gives only an instruction on "what we want".

The QBE is a display based (example type) language which allows a user to give an instruction by setting conditions at an appropriate column while looking at a frame of the table displayed on a terminal equipment.

While a SQL type language is structured to implement instructions from definition of a table for manipulation and deletion within one language system, a QBE type language is structured to implement only manipulation of a table.

The relational data base system provides also an instruction type referred to as a storage type in which previously stored instruction on manipulation of a relational data base is called for execution whenever necessary.

Manipulation of a relational data base such as modification, deletion and search of a table requires definition of an operation procedure in a text format by utilizing such commands as "SELECT", "FROM" and "WHERE", for example, in a SQL type language. Almost all the data as objectives of manipulation of a relational data base are data of table format based on the above-described relation table. It is not necessarily easy for a user to define an operation procedure while re-grasping in a text format the data construction from such table format.

In addition, although the manipulation procedure after the completion of definition can be stored for additional use, the manipulation procedure read out for the additional use, which is described in a text format, has too low understandability to be used.

With QBE, it is possible to describe a manipulation procedure in a table by reading out a table using and filling the table with such commands as "DRAW" and "DRAW COND". This QBE also allows a graphic representation of a simple procedure by using a table only. For describing a complicated manipulation procedure, however, the QBE requires a description in the text format in which an unlabeled column is called by using "ENLARGE" or the like and a manipulation procedure is described in this column in the text format. The same problem as in the case of SQL therefore arises.

Software for visually acquiring a relational data base is described in "Relational Data Base for Macintosh with Substantial Management Function", by N. Nisho, Nikkei BYTE, July 1990, pp. 186–pp. 198.

The software provides independent graphical editing means for designing of data structure, layout of display data and such. Complicated manipulation procedures should be described using a flow chart even with this software.

SUMMARY OF THE INVENTION

An object of the present invention is to provide a data base manipulation environment with high operability and understandability for a data base.

On a data base manipulation system according to the present invention, operational manipulation such as retrieval, addition and modification of a data base is defined and executed by using only diagrams in a table format displayed on a screen. More specifically, the data base manipulation system according to the present invention includes first means for describing input data including an input table as an object for manipulation and an output table in which manipulation results are displayed when output data is represented in the table format, second means for describing, in a non-text format, all the operation at manipulations to be performed on the above-described input data described in the table format, and means for accessing a relational data base in response to the data from the above-described first and second means. The above-described input table in which input data which are objects for manipulation and represented in a table format has a region wherein operational manipulations are described, and the output table indicative of manipulation results has a region wherein map relations between the input table data and the output table data are described. Manipulation flow is represented by a connection line with directionality to allow a description of an operational manipulation on the input data represented in a table format without using a text format.

The first means describes the input table as an object of manipulation and the output table indicative of a manipulation result in a table format. The second means describes an operational manipulation at a predetermined region of the input data represented by the first means, thereby defining the contents of the manipulation. As a result, a user is allowed to define and execute a manipulation procedure by means of a non-text language with only a diagram.

The foregoing and other objects, features, aspects and advantages of the present invention will become more apparent from the following detailed description of the present invention when taken in conjunction with the accompanying drawings.

DESCRIPTION OF THE PREFERRED EMBODIMENT

Figure 1:
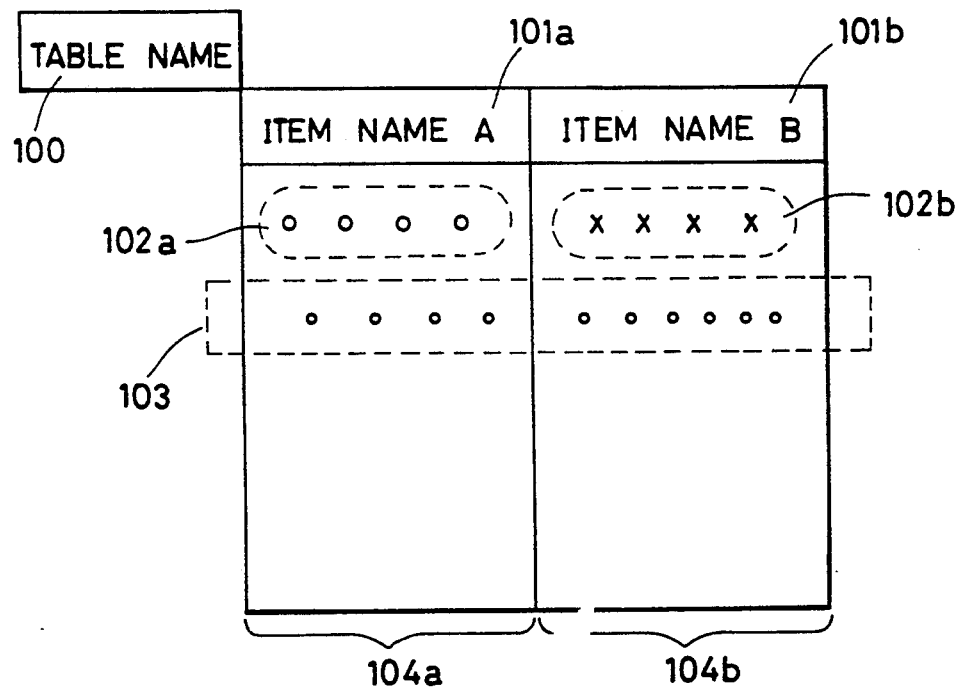
FIG. 1 is a diagram showing an example of an construction of a table of a relational data base.
Figure 2:
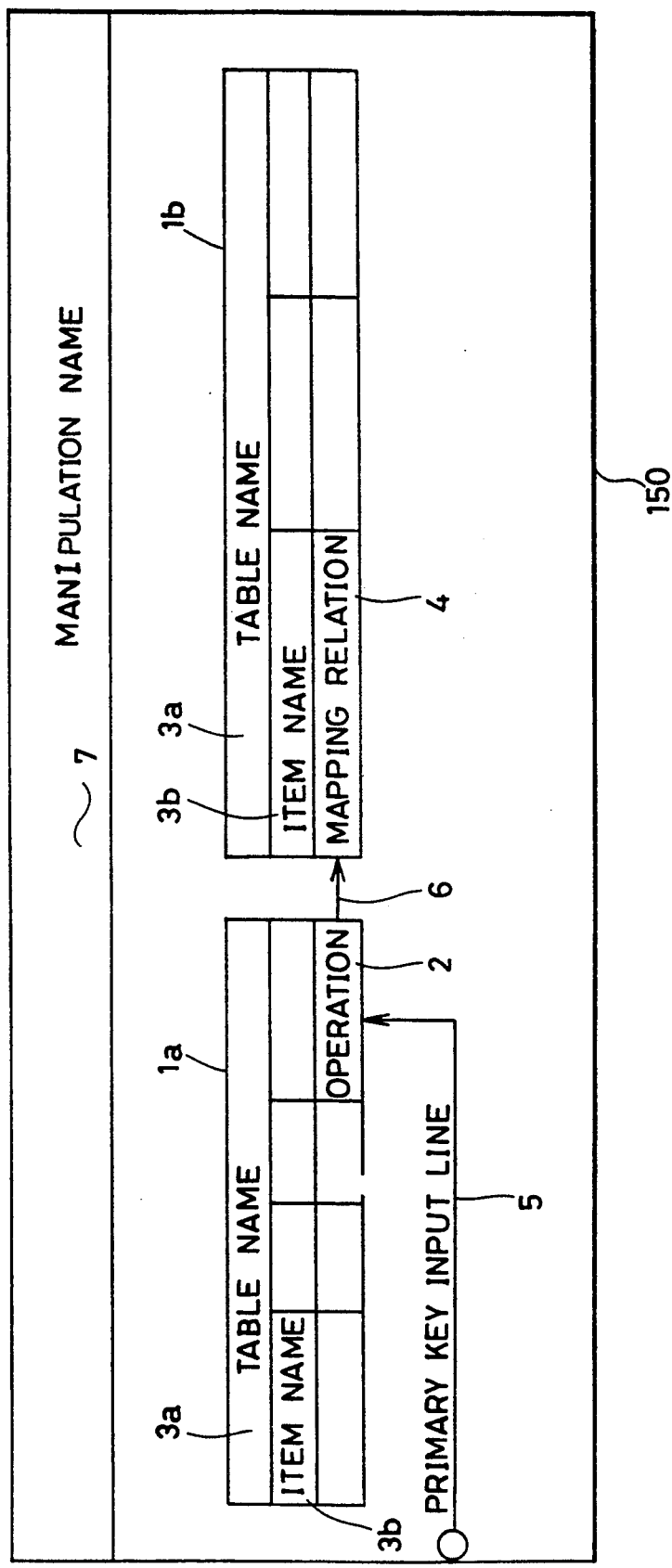
FIG. 2 is a diagram showing an construction of a basic representation on a data base manipulation system according to the present invention.

FIG. 2 shows a basic construction of a data base manipulation system according to the present invention. In FIG. 2, displayed on a display screen 150 are a table 1a (relation table: referred to as an input table hereinafter) representing data as objects of manipulation and a table 1b (hereinafter referred to as an output table) representing data obtained as a result of manipulation. The input table 1a and the output table 1b represent input data. The input table 1a includes an operational manipulation description region 2 defining an operation with respect to the input table 1a under each item (product name code, product name or the like) of item name description region 3b and a table name description region 3a wherein a table name is described.

The output table 1b includes, in addition to the item name description region 3b and the table name description region 3a, a mapping relation description region 4 for describing a map relation between each item in the table 1a and each item in the table 1b, under the item name description region 3b.

The operational manipulation description region 2 in the table 1a is connected to an input line 5 indicative of an input of key data (primary key) to be applied to an operational manipulation described in an associated description region 2.

Provided between the input table 1a and output table 1b is a connection line 6 indicative of a manipulation flow for showing which is an object for manipulation and which is a result of the manipulation. The connection line 6 is shown by an arrow, a direction of which arrow identifies an input table as an object for manipulation and an output table indicative of a manipulation result. In FIG. 2, the connection line 6 is illustrated facing right to indicate that the data in the table 1b is generated from the data in the table 1a.

The display screen 150 further includes an operation name description region 7 wherein a name defined by the diagrams of the manipulation table is described. A method of describing the basic manipulations will be specifically described in the following.

Figure 3:
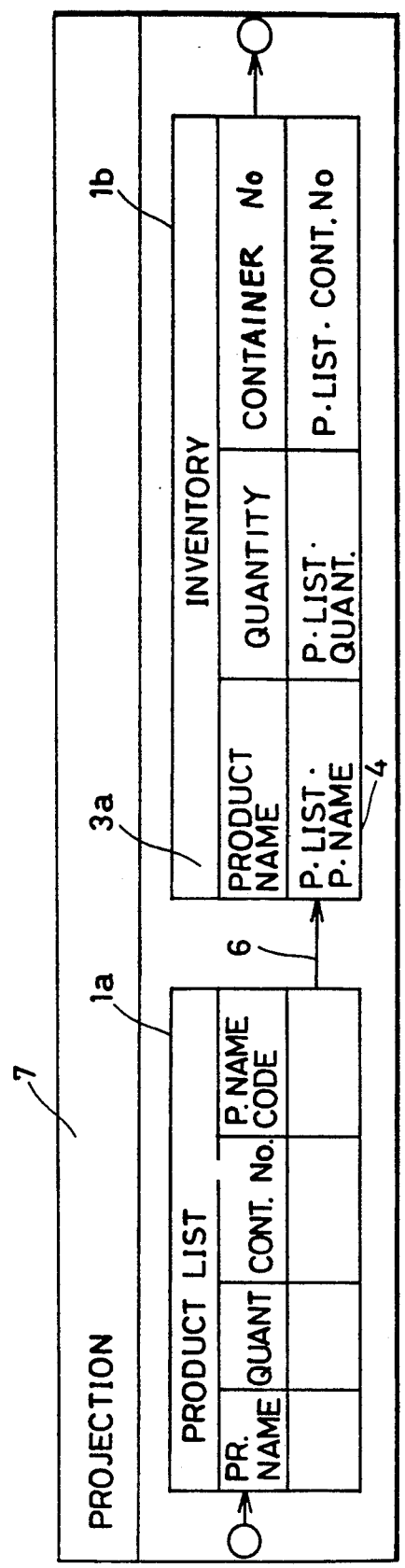
FIGS. 3, 4, 5, 6, 7, 8, and 9 are diagrams specifically showing description manners of a basic manipulation for use in the data base manipulation system according to the present invention.

FIG. 3 shows one example of a manner of describing a projection manipulation. "Projection" is a manipulation of extracting a particular column (item) from a table. The conditions of projection are written as table names and item names in the mapping relation description region 4 in the output table 1b. FIG. 3 shows a manipulation of extracting a product name, the quantity of the product and a container number in a product list described in the input table 1a and describing the same in an inventory written in the output table 1b.

Figure 4:
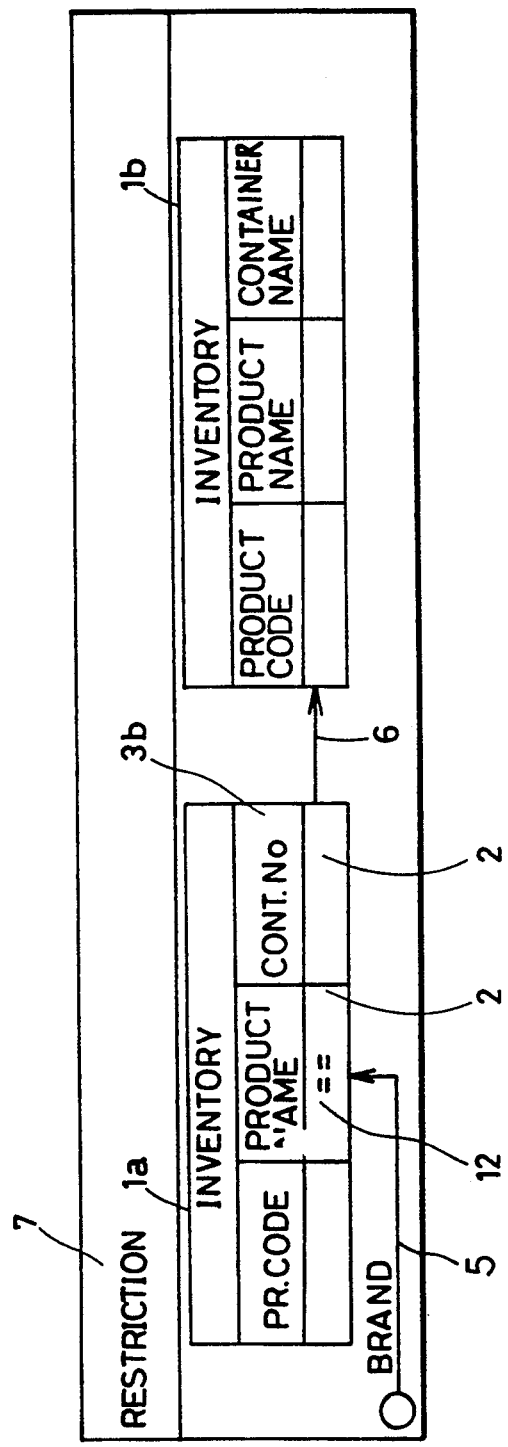

FIG. 4 shows one example of a manner of describing restriction condition. "Restriction" is a manipulation of extracting a row meeting a particular condition from a table. In FIG. 4, "restriction" condition 12 is described under the item name to be restricted in the operational manipulation description region 2 in the input table 1a. As shown by an input line 5, key data for the "restriction" condition 12 is separately supplied. FIG. 4 shows an example of a manipulation of making a new inventory by extracting a product code and a container number of a product equivalent to "brand" supplied through the input line 5 from the product list described in the input table 1a.

Figure 5:
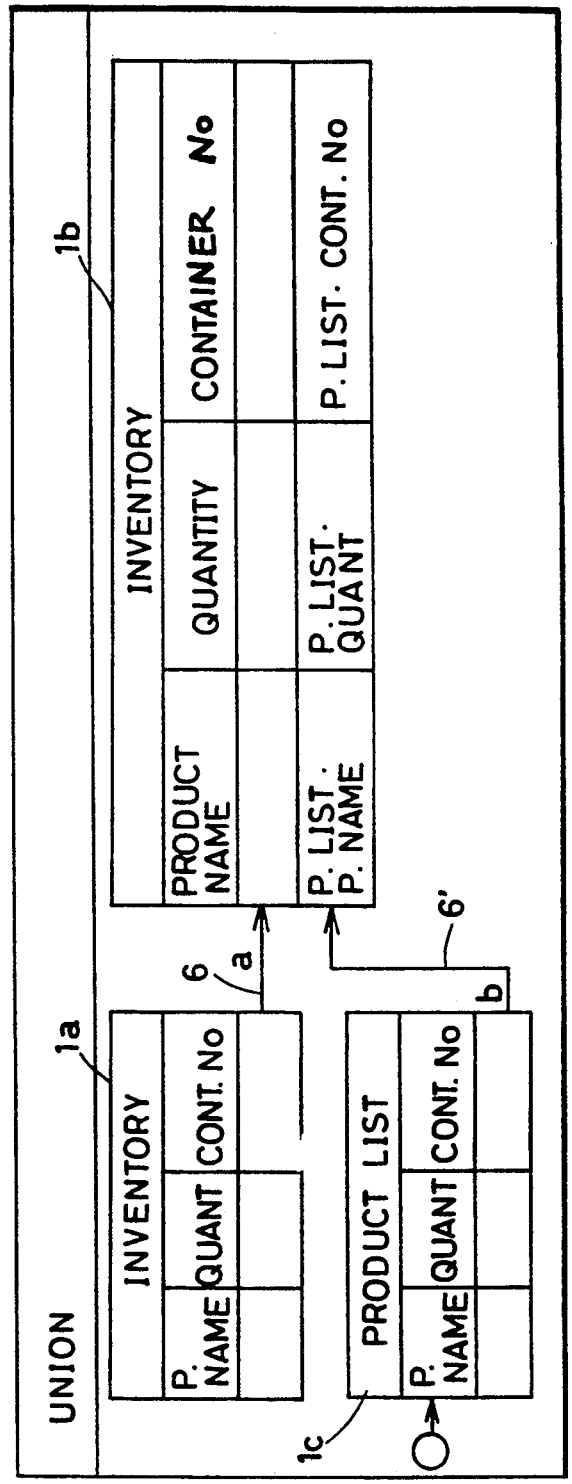

FIG. 5 is a diagram showing a manner of describing a union manipulation. "Union" is a manipulation of linking a reference result of a table together with a reference result of another table. The "union" manipulation is denoted by connection lines 6, 6'. Through the connection lines 6, 6', an input initial value a is mapped into the output table 1b to constitute the data of the output table 1b and a second input initial value b is subjected to a projection manipulation, thereby forming the output table 1b with each item linked together with the corresponding item of the input table 1a.

Figure 6:
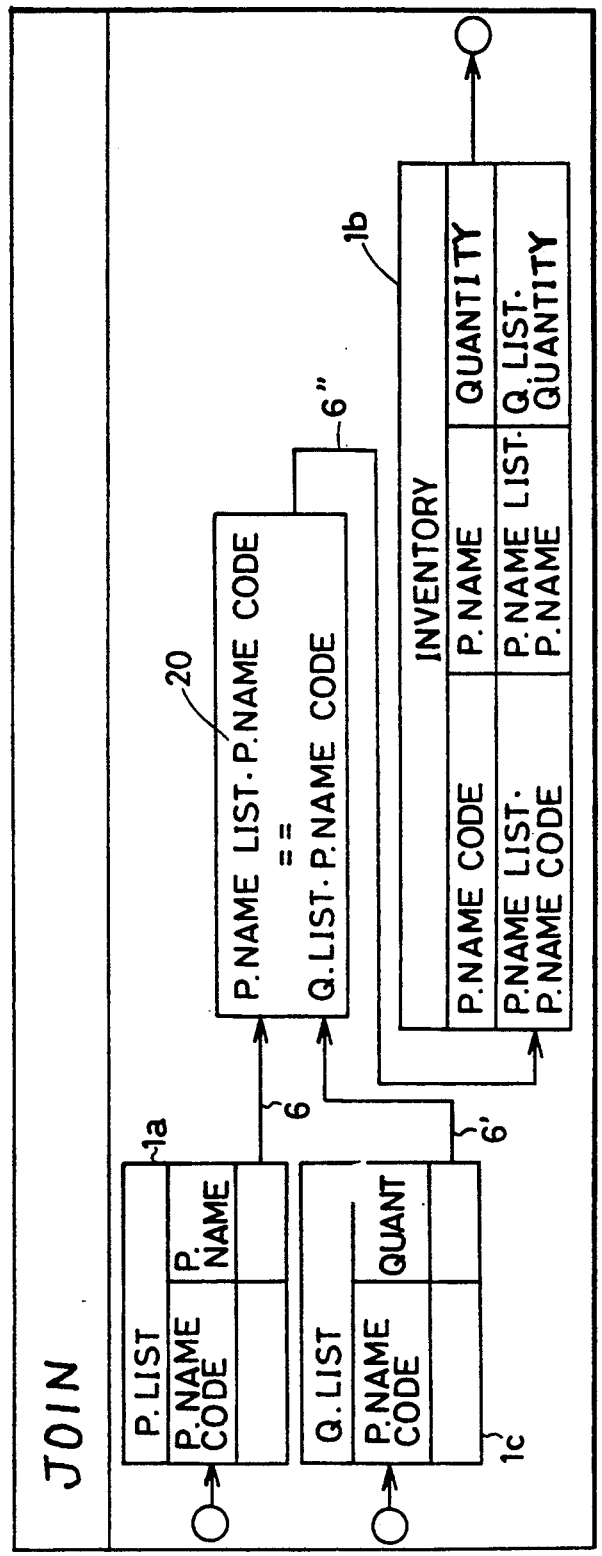

FIG. 6 is a diagram showing an example of a manner of describing a join manipulation. "Join" is a manipulation of creating a table based on two or more tables. Conditions of this "join" are described in a condition description region 20 provided between the input tables 1a and 1c, and the output table 1b. FIG. 6 shows, as an example, a case where another inventory is created as an output table 1b by extracting the product with the same product code name and the quantity from the respective input tables 1a and 1b.

Figure 7:
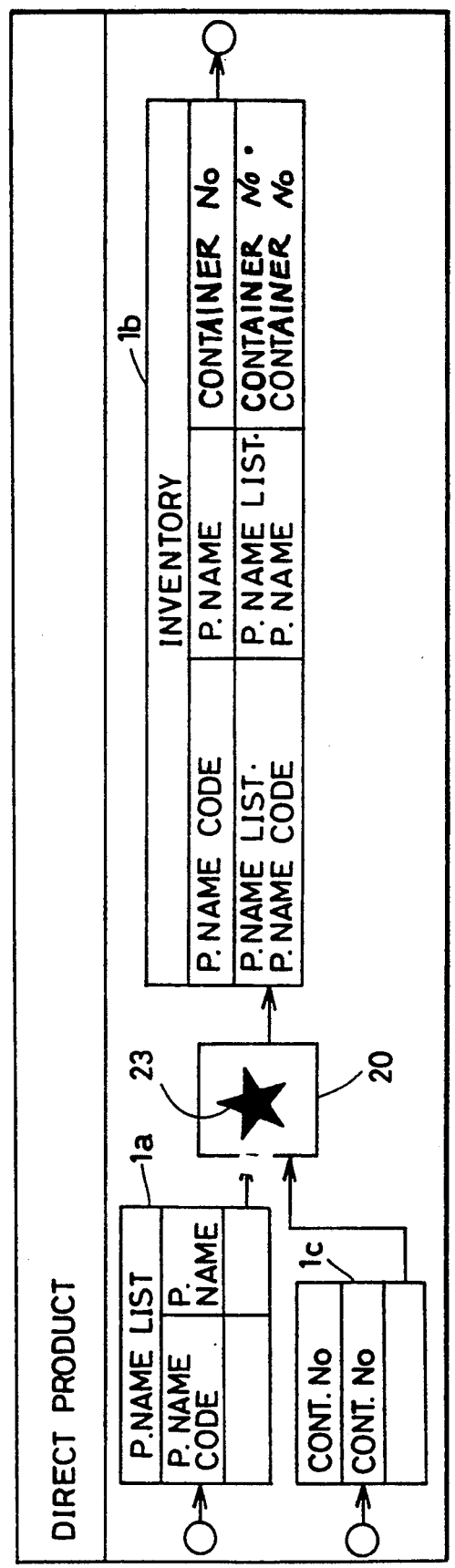

FIG. 7 shows one example of a manner of describing a direct product manipulation. "Direct product" is a manipulation of creating a table based on the combination of various data in a plurality of tables. In FIG. 7, an asterisk mark 23 indicative of "direct product" is described in the condition description region 20. FIG. 7 shows creation of a new inventory based on the respective data (items) in the input tables 1a and 1c.

Figure 8:
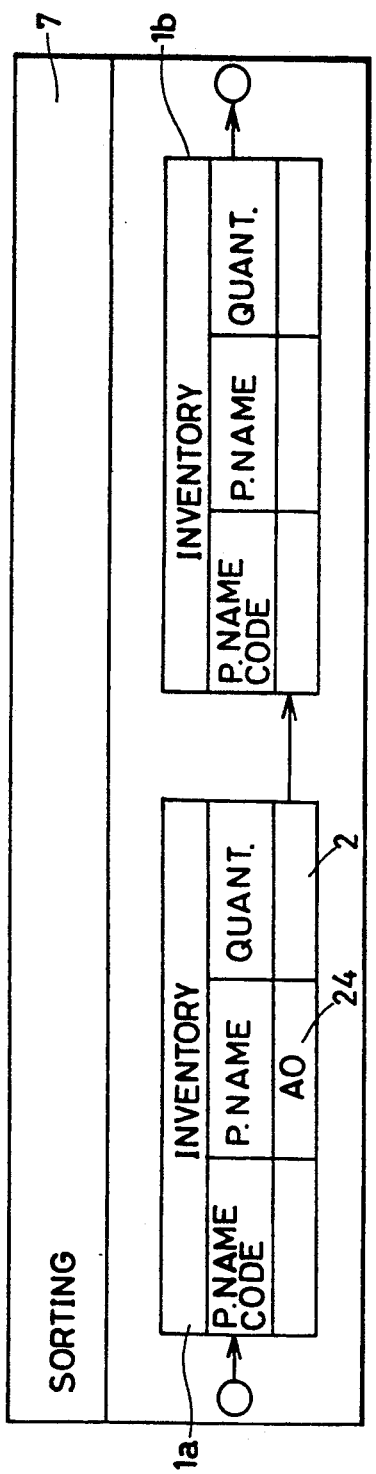

FIG. 8 shows an example of a manner of describing a sorting manipulation. "Sorting" is a manipulation of rearranging data in a certain table under particular conditions imposed to a certain item. A "sorting" manipulation includes a manipulation AO for sorting data in an ascending order and a manipulation DO for sorting data in a descending order. Sorting conditions are described in the operational manipulation description region 2 under an item to be sorted in the input table 1a. FIG. 8 shows, as an example, a manipulation of sorting the data in the input table 1a in the alphabetical order of product names or in the ascending order of the Japanese syllabary.

Figure 9:
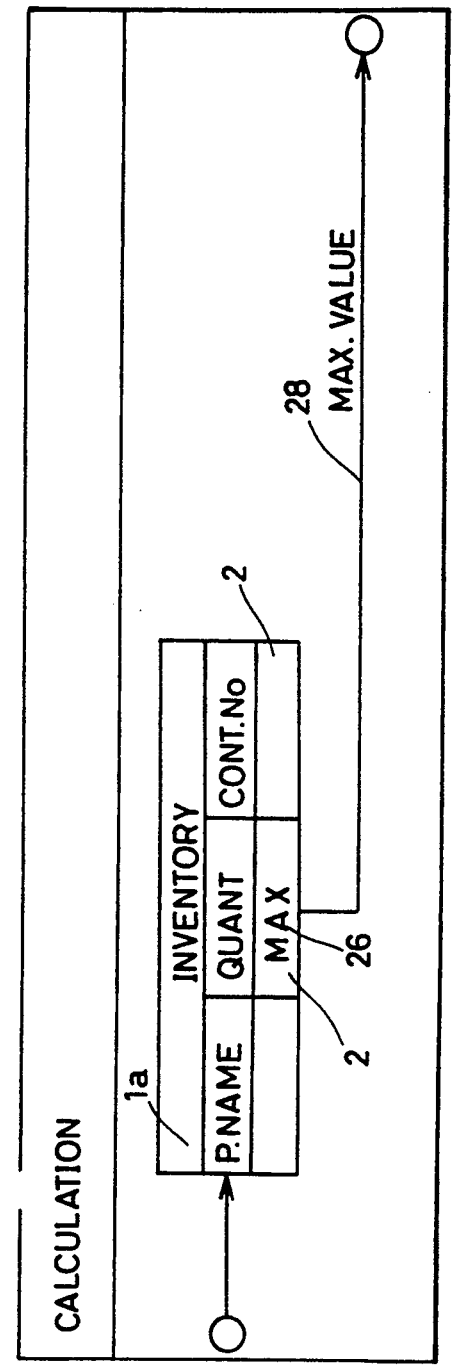

FIG. 9 is a diagram showing one example of a manner of defining a calculation manipulation. An operator 26 for prescribing a calculation manipulation is described in the operational manipulation description region 2 under an item to be calculated in the input table 1a. The example shown in FIG. 9 represents a manipulation for obtaining a maximum quantity among the quantities of the products described in the inventory 1a. Operators for describing a calculation manipulation include "SUM" for obtaining a total value, "AVG" for obtaining a mean value, "MIN" for obtaining a minimum value, "CNT" for obtaining the number of rows. A data output obtained as a result of calculation is described by means of an output line 28. In the example shown in the drawing, a value indicative of a maximum of the numbers of the products described in the inventory is extracted through the output line 28.

Figure 10:
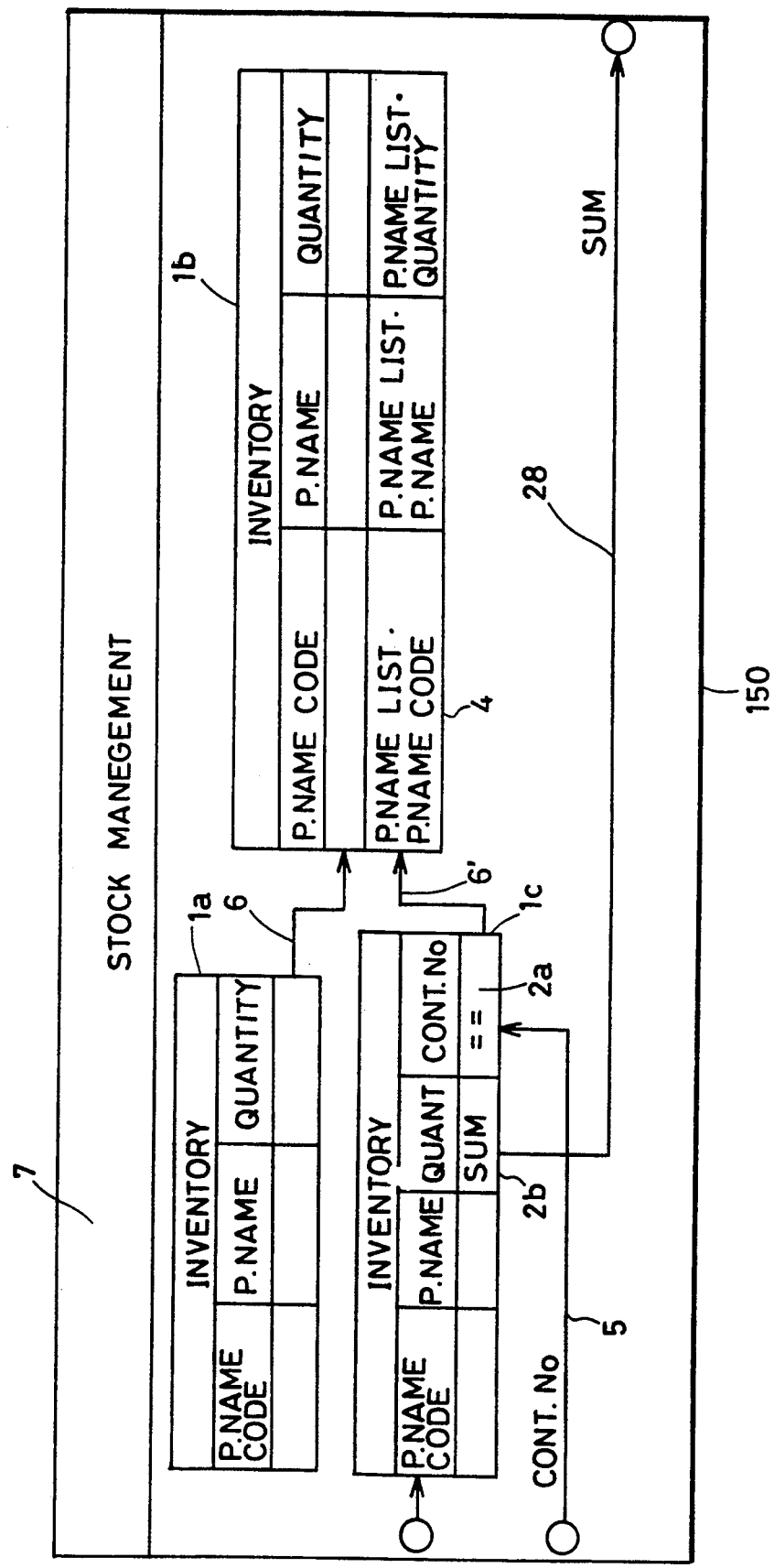
FIG. 10 is a diagram showing an example of a manner of describing a complicated manipulation procedure by combining basic manipulations in the data base operation system according to the present invention.

A complicated manipulation can be described on a single screen 150 by combining a plurality of the above-described basic manipulations. FIG. 10 shows one example of data base manipulations which are a combination of basic manipulations. In FIG. 10, a data base manipulation is shown as an example which combines a restriction manipulation, a union manipulation, a projection manipulation and a calculation operation. More specifically, the restriction "select data with the container number coincident with the container number supplied through the input line 5" is described in the operational manipulation description region 2a in the input table 1c. The input table 1c after the restriction is united with the input table 1a, thereby creating the output table 1b. The union of the input tables 1a and 1c is described by means of the connection lines 6, 6'. The conditions of projection of the input table 1c onto the output table 1b is described in a mapping condition description region 4 in the output table 1b.

The operator "SUM" is described in an operational manipulation description region 2b in the input table 1c. The result of the calculation manipulation is extracted as output data by the output line 28. In FIG. 10, a sum of the total quantities of the products described in the product list 1c is output as output data.

More complicated and larger-scaled data base manipulation can be defined by linking together each representation (identified by a manipulation name described in the manipulation name description region 7) wherein a procedure of this data base manipulation is described.

Figure 11:
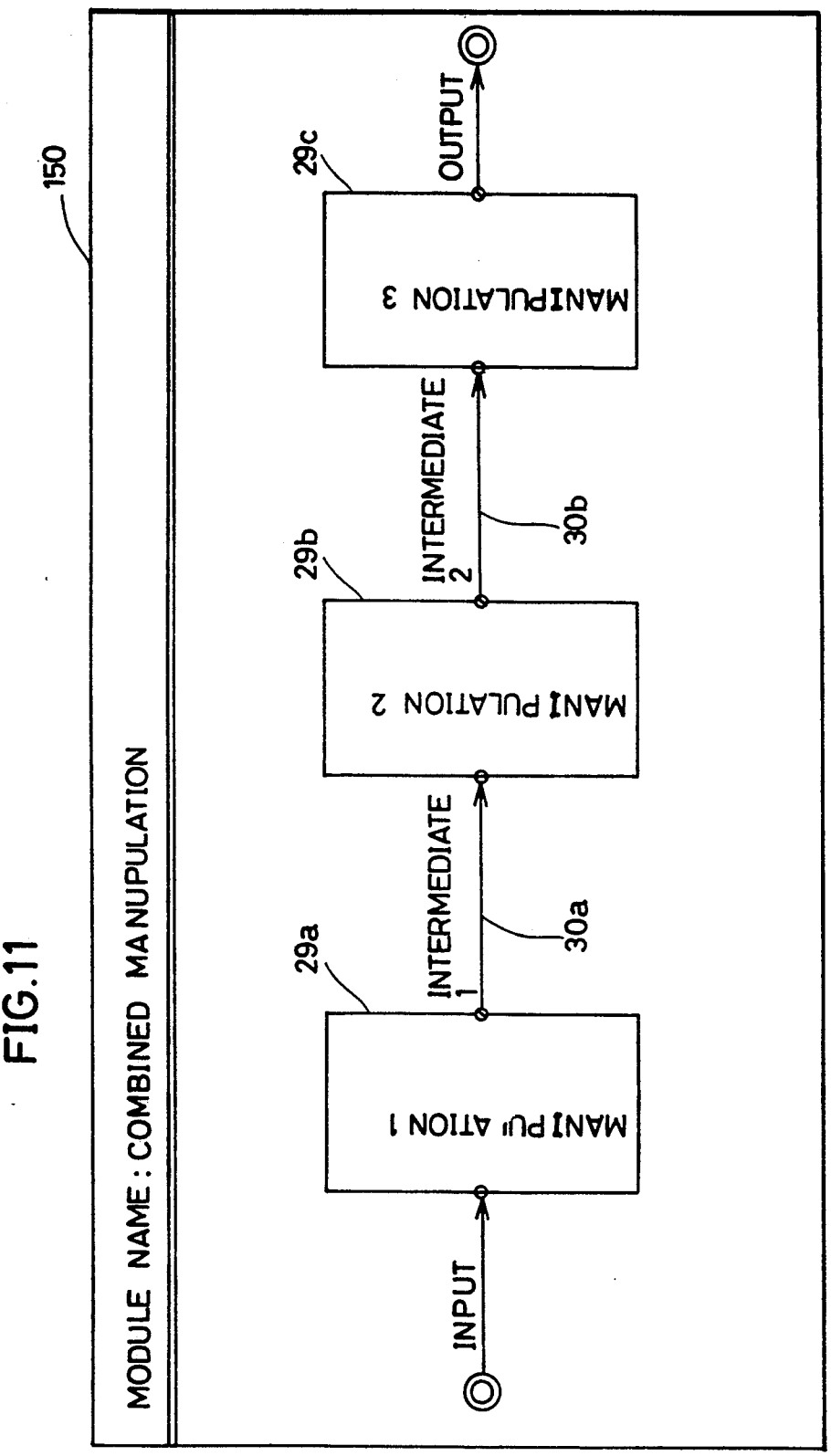
FIG. 11 is a diagram showing an example of a description manner of describing a larger-scaled operation procedure by combining a plurality of manipulation procedures.

FIG. 11 is a diagram showing one example of a description manner defining a larger-scaled manipulation by linking a plurality of data base manipulations together. FIG. 11 shows, as an example, a description manner in sequentially executing a first manipulation 29a, a second manipulation 29b and a third manipulation 29c. A data flow in the procedure of the manipulations 29a–29c is described by means of the connection lines 30a and 30b.

The above-described data base manipulation system allows graphic description of all the manipulations in an interactive manner to make the data base manipulation system more convenient and understandable for a user. An construction for materializing the above-described data base manipulation system will be described. Creation of a relation table will be first described.

Figure 12:
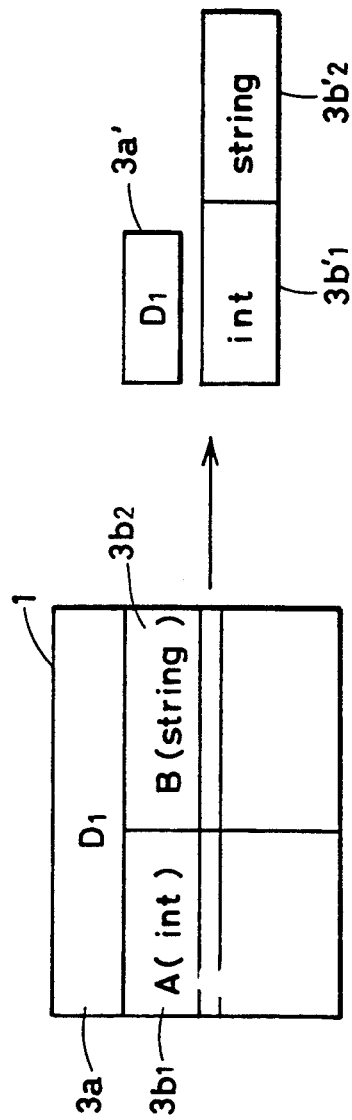
FIGS. 12(a) and 12(b) are diagrams which show an example of an operation of defining a data construction for forming a basic relation table.

Operation in newly defining relation table will be described. In this case, an appropriate relation table is selected among previously prepared basic input relation tables. A name of the table as an object for manipulation is described in the table name description region 3a in this selected relation table. This name description may be done through movement of a cursor to an appropriate position or by using a keyboard and a cursor or by using a mouse. This table name is coded without modification. Then, the item names (A, B) together with the format of the data are described in the item name description regions 3b1 and 3b2. For example, an integer (int) or a string (string) is defined for the item name A. As a result, the input data is produced as shown in FIG. 12A. For the relation table created by the user's filling of data therein, a record region for an construction (int, string) of the data to be filed is ensurely acquired under a heading at the relation table name description region 3a' (table name D1) within a processor (will be described later), as shown in FIG. 12B.

Figure 13:
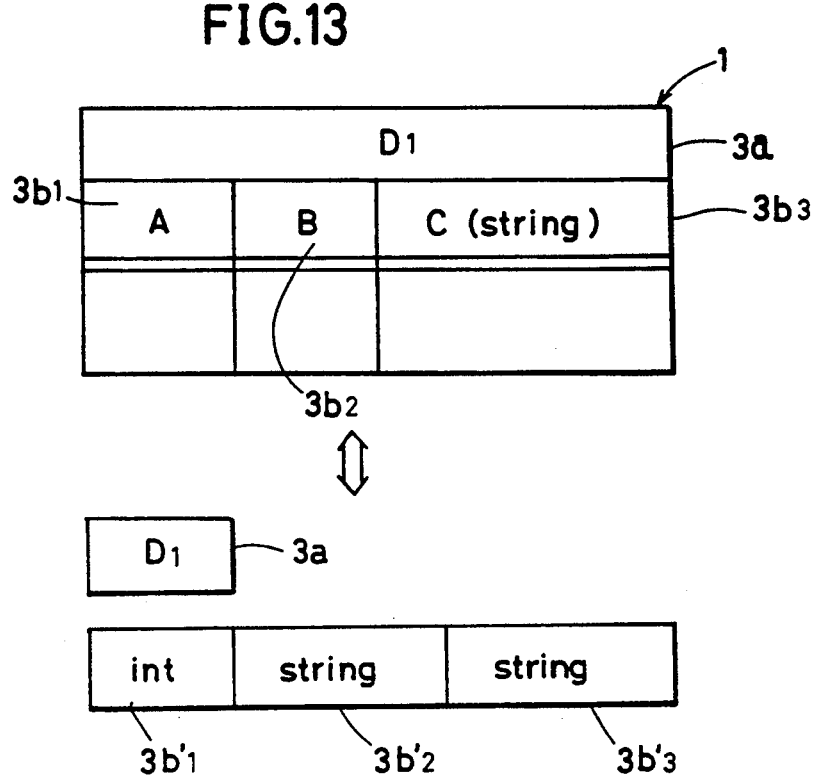
FIG. 13 is a diagram showing an example of operation manner in changing a data construction of a relation table.

A manner of changing an input data construction will be described with reference to FIG. 13.

First, a relation table to be modified is read out and instruction of a change of a data construction is provided. In response to the instruction of change, a new item C is added and data construction thereof is described (string in FIG. 13). As a result, the data construction (int, string, string) of the relation table is changed.

Figure 14:
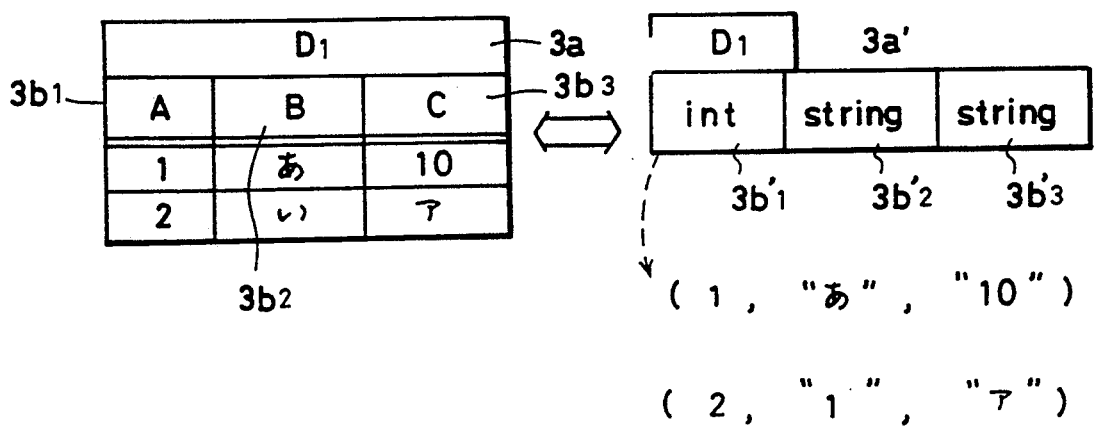
FIG. 14 is a diagram showing an example of a manner in describing data in a relation table.
Figure 15:
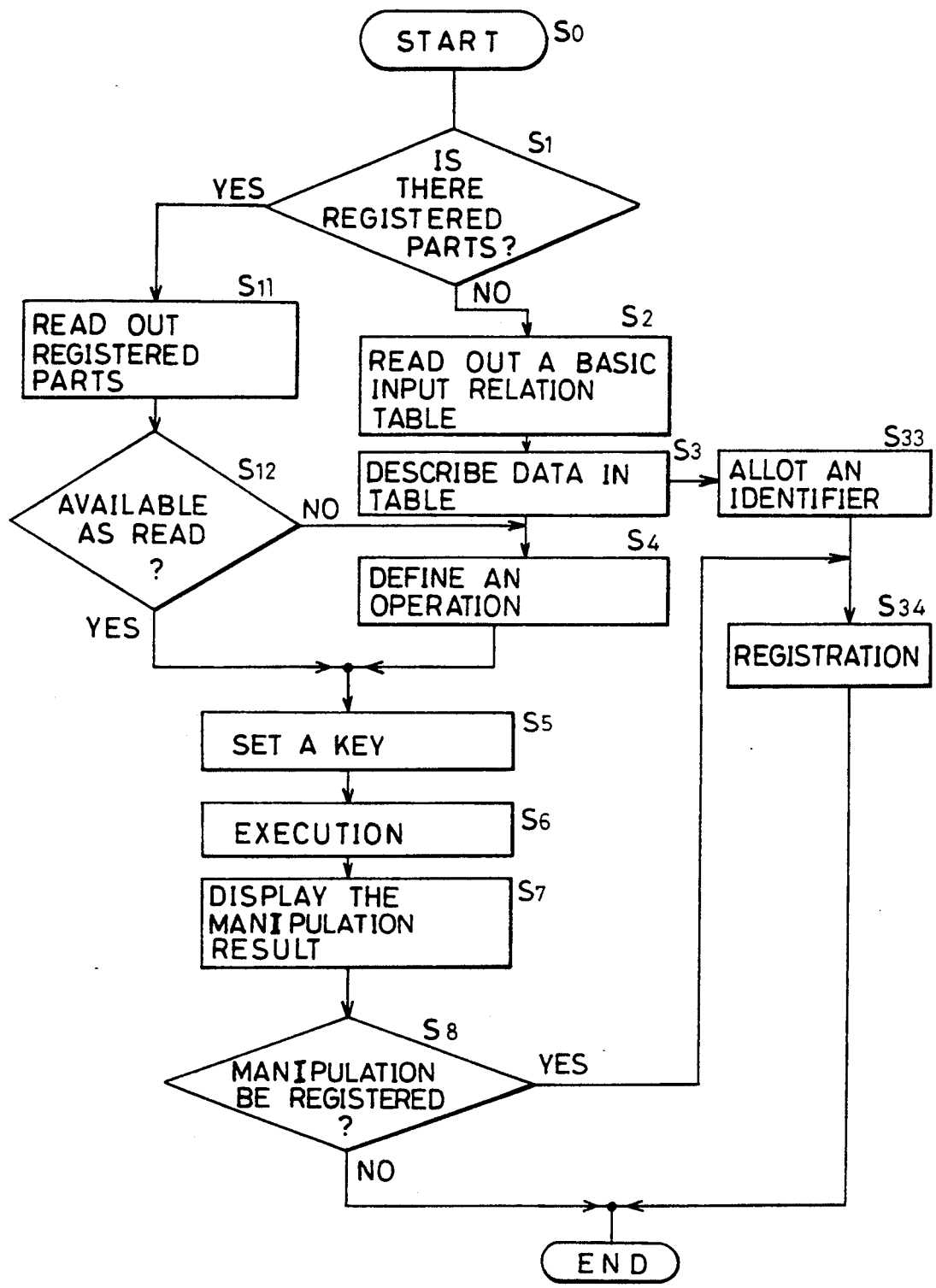
FIG. 15 is a flow chart showing operation in the data base manipulation system according to the present invention.

In creating of a data base, a created relation table is read out and data to be input under each item of the read out table is written as shown in FIG. 14. The processor creates a record under the table name "D1" according to the defined data construction, thereby creating a data base. Now, a data base manipulation system will be described with reference to the operation flow diagram shown in FIG. 15.

First, an operator or an user enable the system to activate a data base manipulation routine or an unit (step S0).

Then, an inquiry is made about registration of a desired relation table or a desired manipulation procedure in the system (step S1). Relation tables and manipulation procedures stored in the system are referred to as "parts". When a desired manipulation procedure or relation table is not registered, a basic input relation table previously prepared in the system is read out (step S2). Data is written in the read out basic input relation table to define a data construction of the table. At this step, if a data construction related to each item in the table is registered as an identifier, the data is written in a desired region of the table by using the identifier. A new identifier is allotted to an item or table with no identifier allotted thereof (step S33).

The identifier applied to a table name, the item name or a manipulation procedure name (the manipulation procedure name will be described later) is registered in the system and used as a key for a future reference of the parts (step S34).

In writing of data in the table at step S3, input table and output table (if necessary) are read out and necessary data is written therein. In a case where a data construction of the read out basic input relation table differs from that of a desired relation table, data is written in a table after specifying of a data construction and converting of the data construction into the construction of the desired relation table as shown in FIG. 13.

When it is found at step S1 that the desired relation table or the desired operation procedure has already registered, a code indicative of the registered part is supplied to the system reading out the corresponding registered part (step S11). The registered part can be read out at a desired level of the relation table, the entire operation procedure and the partial operation procedure and it is also registrable as "part" at each respective level. Then, the user makes a determination as to whether the operation procedure of the read out registered part or data item of the relation table is completely coincident with the desired operation or not (display of the respective tables on a visible display unit in the relation table allows the user to make a determination by checking the respective tables on the screen or the mutual relation therebetween). When the user makes a determination that the data is not available, the user proceeds to step S4 (or S3).

Definition of a desired necessary operation is carried out on the defined relation table (input data) at step S4. The definition of operation is described in such a manner as shown in FIG. 2 or FIG. 10. Then, setting of a necessary key is made (step S5). The key setting can be carried out by giving the execution instruction for the step S6 and then setting a desired key to fill the table (or item) displayed on the screen in the form of a multiwindow, for example.

Then, execution instruction is issued after the key setting (step S6). The execution result is displayed in the form of a table defined by the output table or of the calculation result value (step S7).

Then, a determination is made as to whether registration of a necessary relation table or operation procedure in this manipulation of the data base should be made (S8). Registration is designated of the relation table or the operation procedure which is determined to be registered, and the system allots a desired identifier to a part designated to be registered and stores the part (S34). The registered part is registered in such a graphical manner as representing the form and construction of the expressed relation tables. Therefore, a read out registered part will be displayed in the representation form as graphically describing the operation procedure in a relation table form on the screen. This enhances operability and understandability for a user, thereby improving the re-usability of a registered part.

Figure 16:
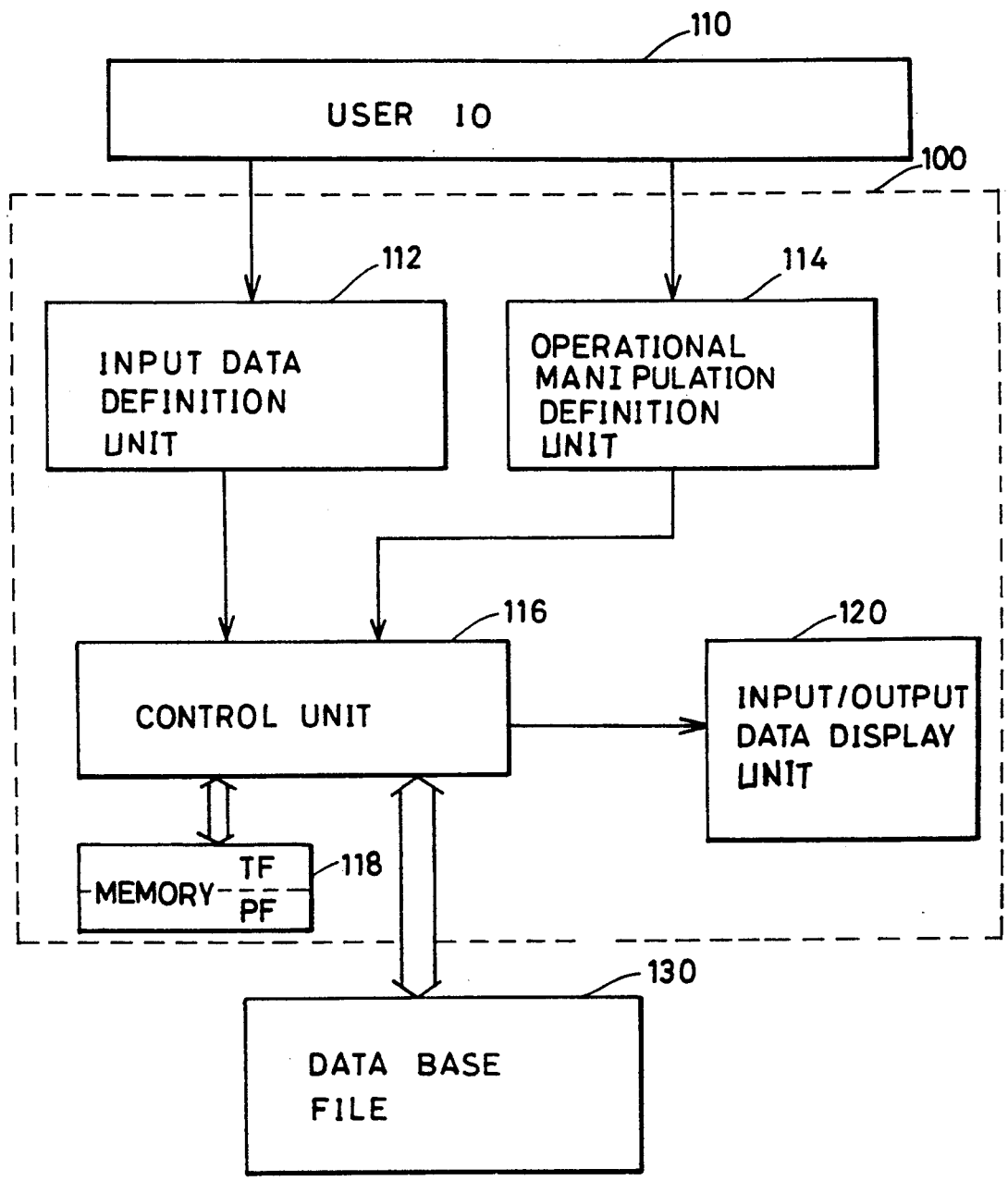
FIG. 16 is a schematic diagram showing an entire construction of a data base manipulation system according to one embodiment of the present invention.

This data base manipulation system can be implemented on a software or hardware basis. FIG. 16 shows one example of an apparatus construction in a case where the data base manipulation system is implemented by using hardware.

With reference to FIG. 16, a data base manipulation apparatus 100 comprises an input data defining unit 112 for defining input data supplied by a user through a user IO (input/output interface) 110, operational manipulation defining unit 114 for defining an operational manipulation received from the user IO 110, a control unit 116 responsive to data from the input data defining unit 112 and the operation of calculation defining unit 114 for performing a data base operation, and an input/output data display unit 120 for displaying the input data and the output data under the control of a control unit 116.

The control unit 116 is provided with a memory 118 for registering parts and serving as a work region for temporarily storing data. The memory 118 includes a temporary file TF and a permanent file PF, for example. The permanent file stores information on registration of parts and the temporary file TF stores data necessary for manipulation being executed. After completion of a certain program or a data base manipulation, the contents of the temporary file TF are erased. The contents of the permanent file PF are continuously maintained. The data base manipulation apparatus 100 writes and reads data to and from a data base file 130. The data base file 130 stores data of a desired relation table. Operation of the respective unit will be described in the following.

The user IO 110 includes a graphic input device such as mouse. A user inputs desired data in an interactive manner while checking graphical appearing information on the input/output data display unit 120.

The input data defining unit 112 is activated in response to an instruction for creating input data supplied from the user IO 110. When existence of a registered part is inquired through the user IO 110, the input data defining unit 112 refers through the control unit 116 to the part registration section (permanent file PF) of the memory 118. If the corresponding part exists, the defining unit 112 supplies the corresponding part to the input/output data display unit 120 under the control of the control unit 116. The user defines various necessary data with respect to the relation tables displayed on the input/output data display unit 120. The input data defining ᵂ : 112 correlates the definitions with each of desireᵈ ᵘata constructions, to create a relation table which is supplied to the control unit 116.

The operation of operational manipulation defining unit 114 is activated in response to the instruction for defining operational manipulation from the user. The defining unit 114 receives through the user IO 110, information on operational manipulation which the user defines using a relation table or the connection line with respect to the graphics displayed on the input/output data display device 120 and makes a definition on the operational manipulation following a predetermined rule for each of received input operational manipulation information.

The control unit 116 stores away the input data construction supplied from the input data defining unit 112 and the operational manipulation supplied from the operational manipulation defining unit 114 both in the memory 118. The information on definition of manipulation supplied from the operational manipulation defining unit 114 is stored in the memory 118 (temporary file TF) so as to correspond with each item or table of the input data defined by the input data defining unit 112. The correspondence of each manipulation with a table or item name is made by identifying a data input position on input/output display unit 120. As a result, the manipulation procedure is stored in the memory 118. Then, the execution instruction given by the user through the user IO 110 activates the execution circuitry of the control unit 116, whereby the manipulation procedure supplied by the user is sequentially read out from the memory 118 for access to the data base file 130. After obtaining desired data through the access to the data base file 130, the data is displayed on the input/output data display unit 120. The data is displayed on the input/output data display unit 120 in the form of a relation table, or of a simple numerical value when the data is a calculation result.

While the control unit 116 applies identifiers to the input data information received from the input data defining unit 112 and stores the same in the memory 118. The unit 116 adds to the operational manipulation supplied from the operational manipulation defining unit 114, an identifier for making an operation identified with input data and stores the result in the memory 118. As a result, the order of operational manipulation is maintained. In addition, when a registration instruction is given through the user IO 110 (a path for use therein is not shown) with respect to one semantically completed description (a relation table or the entire manipulation procedure or an item name), the control unit 116 stores the same in the permanent file (PF) of the memory 118. This construction enables graphic storage of a data base manipulation procedure or a relation table represented in a graphical manner.

Like a graphical editor, for example, the input data defining device 112 and the operational manipulation defining unit 114 have functions of interpreting given graphical information or definition information based on a conversion table contained therein to generate the corresponding data. That is, the function of this input data defining unit 112 and the operational manipulation defining unit 114 is considered to be similar to that of an editor with drawing and editing functions.

As described above, the present invention enables definition and execution of such operational manipulation as search, addition and modification of a data base in an interactive manner by using graphical representation in a table format, leading to defining of an operational manipulation by using language of non-text format. Therefore, a user is allowed to define manipulation procedures by using the same representation format, that is a table format, as that of original data of a relational data base, resulting in facilitating of a data base manipulation which has been conventionally complicated, and resulting in a data base manipulation system implementing an environment for description manipulation with high understandability.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of manipulating a data base storing data in a table format, said table including an item area for specifying an attribute of data, said method comprising the steps of:

defining input data including first data to be manipulated and second data to be output as a result of manipulation wherein said first data and said second data are both defined in the table format on a display screen, said step of defining including the step of identifying the first data and the second data by an orientation of an oriented connection line;

defining with a non-sentential graphic format having a predetermined syntax, all operational manipulations to be carried out on said first data of said input data defined, the second mentioned step of defining including the step of defining a manipulation in the item area of the table of said first data of said input data to be manipulated, said oriented connection line indicating a direction of flow of manipulations from the first data to said second data;

determining a procedure of manipulating data of said data base according to both the first data of said input data defined in the table format and the operational manipulations defined with the non-sentential graphic format having a predetermined syntax, and producing visual output data in the table format corresponding to said second data defined on said display screen by referring to said data base in accordance with the determined procedure of manipulating data.

2. The method according to claim 1, wherein said step of defining input data includes the steps of:

displaying said first and second of said input data on said display screen in the table format in response to an instruction for creating input data given by an operator, and forming a relation table corresponding to a defined data construction according to a definition of data defined by the operator on the displayed input data, said definition including definition of structure of data.

3. The method according to claim 1, wherein said step of defining operational manipulations includes a step of interpreting the operational manipulations defined with the non-sentential graphic format having a predetermined syntax, to be carried out on said input data.

4. The method according to claim 1, wherein said step of determining a procedure includes a step of applying identifiers to said input data to be manipulated and to said operational manipulation to form a manipulation procedure by using said identifiers.

5. A system for manipulating a relational data base storing data in a table format, comprising:

first means for defining, in a table format, input data to be manipulated, second means for defining with a non-sentential graphic format having a predetermined syntax, all operational manipulations to be carried out on said input data defined in a table format, means for producing visual output data by referring to said relational data base in response to data defined by said first and second means, said input data defined in a table format including an input table representing data to be subjected to an operational manipulation and an output table for indicating the operational manipulation result in a table format required when said output data is produced in a table format, said input table having an operational manipulation description region for defining an operational manipulation, and said output table comprising a region for defining a correspondence between the respective related items of the input and output tables, an operational manipulation being specified in said operational manipulation description region and said region for defining a correspondence between the respective related items of the input and output tables, wherein an operation flow of the operational manipulation is defined by means of an oriented connection line located between said input table and said output table.

6. A system for manipulating a relational data base, comprising:

first means for defining input data including first data to be manipulated and second data to be outputted wherein both said first data and said second data are defined in a table format;

second means for defining an operational manipulation to be performed on said first data of said input data, in a non-sentential graphic format according to a predetermined syntax; and third means for referring to said relational data base using the first data of said input data and the operational manipulation defined by said first and second means to produce visual output data in the table format corresponding to said second data of said input data defined in a table format. said third means including means for performing the operational manipulation defined in the non-sentential graphic format by said second means on said first data of said input data defined in a table format by said first means, said second means including means for producing an oriented connection line having a first end for indicating a data to be manipulated and a second end for identifying a data to be outputted as a result of the operational manipulation, for locating the oriented connection line in said input data to identify said first data and said second data and to indicate a direction of flow of the operational manipulation.

7. The system according to claim 6, wherein an input table, in which the first data of said input data is defined, includes data as an object of the manipulation and further includes an operational manipulation specifying area for specifying the operational manipulation, and an output table, in which the second data of said input data is defined, includes a category of the output data to be produced as a result of the operational manipulation, and further includes a mapping relation specifying area for specifying a correspondence between related items in said input and output tables; and said second means includes means for defining a flow of data in the operational manipulation locating said oriented connection line indicating a flow of data in the operational manipulation between the input table and the output table, and means for specifying visually a content of the operational manipulation itself in said operational manipulation specifying area and said mapping relation specifying area in a non-sentential graphic format.

8. The system according to claim 6, wherein said third means includes means for storing a content of the operational manipulation itself, and for reading out the stored content in another manipulation to reuse the stored content for definition of said another manipulation in referring to said relational data base.

9. The system according to claim 6, wherein said third means includes means for combining a plurality of manipulations of relational operations into a unit manipulation procedure for storage.

10. The system according to claim 6, wherein said first means includes, means being activated in response to an instruction for forming of the input data supplied through a user interface, for displaying the input data in a table format on a display unit, and means for forming a relation table corresponding to a structure of data defined by the user of the system, according to the structure of data which the user defines for the displayed input data.

11. The system according to claim 6, wherein said second means includes means activated responsive to an instruction of defining an operational manipulation supplied through a user interface, for interpreting the operational manipulation which the user defines in the non-sentential graphic format, and for defining the manipulation in the non-sentential graphic format for use in the manipulation.

12. The system according to claim 6, further comprising:

means being active in response to an instruction given by a user through a user interface, for storing, in non-sentential graphical format, a semantically completed description of the input data to be manipulated and said operational manipulation defined by said second means.

* * * * *